United States Patent
Chao et al.

(10) Patent No.: US 9,635,360 B2
(45) Date of Patent: Apr. 25, 2017

(54) METHOD AND APPARATUS FOR VIDEO PROCESSING INCORPORATING DEBLOCKING AND SAMPLE ADAPTIVE OFFSET

(71) Applicant: MEDIATEK INC., Hsin-Chu (TW)

(72) Inventors: Ping Chao, Taipei (TW); Huei-Min Lin, Hsinchu County (TW); Yung-Chang Chang, New Taipei (TW); Chi-Cheng Ju, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 968 days.

(21) Appl. No.: 13/922,481

(22) Filed: Jun. 20, 2013

(65) Prior Publication Data

US 2014/0036992 A1    Feb. 6, 2014

Related U.S. Application Data

(60) Provisional application No. 61/678,295, filed on Aug. 1, 2012, provisional application No. 61/712,934, filed on Oct. 12, 2012.

(51) Int. Cl.
*H04N 19/86* (2014.01)
*H04N 19/176* (2014.01)
(Continued)

(52) U.S. Cl.
CPC ..... *H04N 19/00909* (2013.01); *H04N 19/117* (2014.11); *H04N 19/156* (2014.11);
(Continued)

(58) Field of Classification Search
CPC ........... H04N 19/00909; H04N 19/176; H04N 19/86; H04N 19/156; H04N 19/82; H04N 19/117
See application file for complete search history.

(56) References Cited

U.S. PATENT DOCUMENTS

2004/0228415 A1  11/2004  Wang
2006/0245503 A1  11/2006  Gordon
(Continued)

FOREIGN PATENT DOCUMENTS

CN   101227601 A    7/2008
CN   101867704 A   10/2010
(Continued)

OTHER PUBLICATIONS

Woo-Shik Kim, AhG6: Sao Parameter Estimation Using Non-deblocked Pixels, Joint Collaborative Team on Video Coding (JCT-VC) of ITU-T SG 16 WP 3 and ISO/IEC JTC 1/SC 29/WG 11, 10th Meeting, Jul. 11-20, 2012, pp. 1-7, JCTVC-J0139, M25462, XP030112501, Stockholm, SE.

(Continued)

*Primary Examiner* — Joseph Ustaris
*Assistant Examiner* — Jill Sechser
(74) *Attorney, Agent, or Firm* — Winston Hsu; Scott Margo

(57) ABSTRACT

A method and apparatus for applying DF processing and SAO processing to reconstructed video data are disclosed. The DF processing is applied to a current access element of reconstructed video data to generate DF output data and the deblocking status is determined while applying the DF processing. Status-dependent SAO processing is applied to one or more pixels of the DF output data according to the deblocking status. The status-dependent SAO processing comprises SAO processing, partial SAO processing, and no SAO processing. The SAO starting time for SAO processing is between the DF-output starting time and ending time for the current block. The DF starting time of a next block can be earlier than the SAO ending time of the current block by a period of t, where t is smaller than time difference between (Continued)

the DF-output starting time and the DF starting time of the next block.

25 Claims, 5 Drawing Sheets

(51) Int. Cl.
    *H04N 19/117*     (2014.01)
    *H04N 19/156*     (2014.01)
    *H04N 19/82*     (2014.01)

(52) U.S. Cl.
    CPC ........... *H04N 19/176* (2014.11); *H04N 19/82* (2014.11); *H04N 19/86* (2014.11)

(56) References Cited

U.S. PATENT DOCUMENTS

| | | | |
|---|---|---|---|
| 2011/0116544 A1* | 5/2011 | Fu | H04N 19/176 375/240.12 |
| 2012/0177107 A1 | 7/2012 | Fu | |
| 2012/0230423 A1* | 9/2012 | Esenlik | H04N 19/0089 375/240.24 |
| 2013/0044809 A1* | 2/2013 | Chong | H04N 19/647 375/240.03 |
| 2013/0114683 A1* | 5/2013 | Zhao | H04N 19/82 375/240.03 |
| 2013/0182759 A1 | 7/2013 | Kim | |
| 2014/0192891 A1* | 7/2014 | Alshina | H04N 19/189 375/240.24 |
| 2015/0036758 A1* | 2/2015 | Sato | H04N 19/00424 375/240.29 |

FOREIGN PATENT DOCUMENTS

| | | |
|---|---|---|
| CN | 102263961 A | 11/2011 |
| WO | 2013053324 A1 | 4/2013 |

OTHER PUBLICATIONS

Andrew Segall et al., Unified Deblocking and Sao, Joint Collaborative Team on Video Coding (JCT-VC) of ITU-T SG16 WP3 and ISO/IEC JTC1/SC29/WG11, 7th Meeting, Nov. 21-30, 2011, pp. 1-5, Document: JCTVC-G608, WG11 No. m22174, XP030110592, Geneva.

* cited by examiner

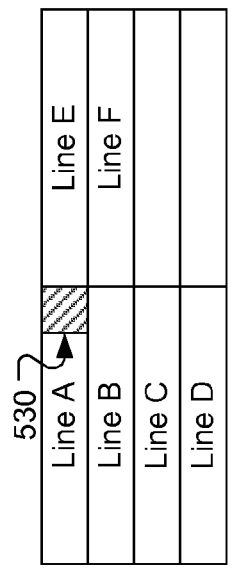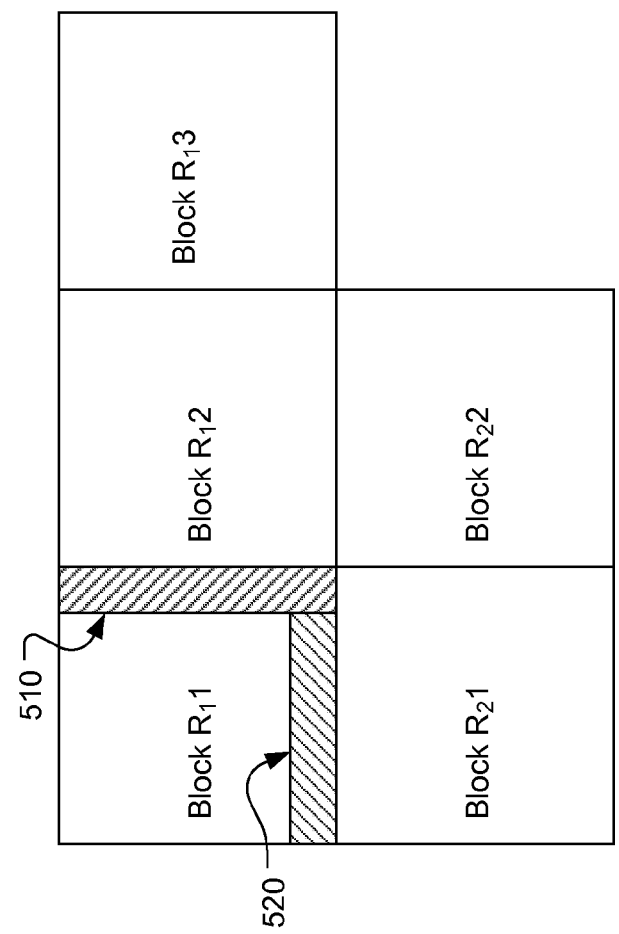

METHOD AND APPARATUS FOR VIDEO PROCESSING INCORPORATING DEBLOCKING AND SAMPLE ADAPTIVE OFFSET

CROSS REFERENCE TO RELATED APPLICATIONS

The present invention claims priority to U.S. Provisional Patent Application, Ser. No. 61/678,295, filed on Aug. 1, 2012, entitled "Method and Apparatus for Video Process in Deblocking Filter and Sample Adaptive Offset", and U.S. Provisional Patent Application, Ser. No. 61/712,934, filed on Oct. 12, 2012, entitled "Method and Apparatus for Video Decoding Process in Deblocking Filter and Sample Adaptive Offset with Reduced Pipeline Buffer and Process Latency". These U.S. Provisional Patent Applications are hereby incorporated by reference in their entireties.

FIELD OF THE INVENTION

The present invention relates to video coding system. In particular, the present invention relates to method and apparatus for improving memory usage and processing efficiency associated with sample adaptive offset and deblocking filter.

BACKGROUND AND RELATED ART

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive inter/intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. In the Intra mode, a reconstructed block may be used to form Intra prediction of spatial neighboring block. Therefore, a reconstructed block from REC 128 may be provided to Intra Prediction 110. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data can be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, deblocking (DF) processing module 130, Sample Adaptive Offset (SAO) processing module 131 and Adaptive Loop Filter (ALF) processing module 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video (i.e., deblocked video); and ALF 132 is applied to SAO-processed video. However, the processing order among DF, SAO and ALF may be re-arranged.

A corresponding decoder for the encoder in FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

SAO processing adopted by HEVC consists of two methods. One is Band Offset (BO), and the other is Edge Offset (EO). BO is used to classify pixels into multiple bands according to pixel intensities and an offset is applied to pixels in each band. EO is used to classify pixels into categories according to relations between a current pixel and respective neighbors and an offset is applied to pixels in each category. In HM-4.0, a pixel can select 7 different SAO types including 2 BO groups (outer group and inner group), 4 EO directional patterns (0°, 90°, 135°, and 45°) and no processing (OFF). The four EO types are shown in FIG. 2.

Upon classification of all pixels in a picture or a region, one offset is derived and transmitted for pixels in each category. In HM-4.0, SAO processing is applied to luma and chroma components, and each of the luma components is independently processed. One offset is derived for all pixels of each category except for category 4 of EO, where Category 4 is forced to use zero offset. Table 1 below lists the EO pixel classification, where "C" denotes the pixel to be classified. As shown in Table 1, the conditions associated with determining a category are related to comparing the current pixel value with two respective neighbor values according to the EO type. The category can be determined according to the comparison results (i.e., ">", "<" or "=").

TABLE 1

| Category | Condition |
|---|---|
| 0 | C < two neighbors |
| 1 | C < one neighbor && C == one neighbor |
| 2 | C > one neighbor && C == one neighbor |
| 3 | C > two neighbors |
| 4 | None of the above |

In the HEVC reference software, deblocking filter processes a whole picture followed by SAO. Then, SAO processing is applied to the deblocked picture. This means that a frame buffer is necessary between the deblocking filter (DF) and SAO. FIG. 3A illustrates an example of software-based implementation, where a frame buffer 312 is used to store a picture processed by DF 310. SAO processing 314 then reads DF-processed data (i.e., deblocked data) from frame buffer 312. The frame buffer can be implemented using an external memory for hardware-based implementation. However, this would result in a high bandwidth overhead. On the other hand, an internal memory (i.e., on-chip memory) would result in higher chip cost.

For hardware-based implementation, system cost is a sensitive issue and neither the external frame memory nor the internal frame memory can offer an affordable solution. In addition, the high bandwidth associated with the external memory approach not only increases system design complexity, but also causes high power consumption. In conventional video coding systems, block-based processing such as motion estimation/compensation and DCT/IDCT has been using block-based processing. In block-based implementation, the picture may be partitioned into MBs (macroblocks) or LCUs (largest coding units). Picture processing is based on rows of LCUs/MBs or tiles, where a tile comprises $N_x \times N_y$ LCUs (or MBs), and $N_x$ and $N_y$ are positive integers. A hardware-based coding system incorporating DF and SAO is shown in FIG. 3B. An LCU buffer 322 is used to store LCUs processed by DF 320. Usually some LCUs in the boundary region of two LCU rows or two tiles need to be buffered due to data dependency associated with DF and SAO. SAO processing 324 then reads DF-processed LCU (i.e., deblocked LCU) and stores the output in an output buffer 326. The overhead associated with the block-based processing corresponds to video data associated with LCUs between any two neighboring block rows or two neighboring tiles to be buffered. Therefore, it is desirable to reduce the buffer requirement for an encoder or a decoder incorporating DF and SAO. In a conventional block-based system with pipeline structure, processing for a block in a current stage usually needs to be finished before the processing moves to the next stage. It is desirable to improve the efficiency of the pipeline processing.

BRIEF SUMMARY OF THE INVENTION

A method and apparatus for applying deblock filter (DF) processing and sample adaptive offset (SAO) processing to reconstructed video data are disclosed. Embodiments of the present invention treat the DF and SAO processing as single-stage pipelined structure to reduce processing latency and to increase cost-efficiency. The status of the deblocking output has to be monitored closely in order to achieve the high performance goal. In one embodiment, the monitoring task can be performed by the DF processing module, SAO processing module, or jointly. According to the present invention, the DF processing is applied to a current access element of reconstructed video data to generate DF output data corresponding to the current block and the deblocking status is determined during applying the DF processing. Furthermore, status-dependent SAO processing is applied to one or more pixels of the DF output data corresponding to the current block according to the deblocking status. The status-dependent SAO processing comprises SAO processing, partial SAO processing, and no SAO processing.

The deblocking status may be determined by the DF processing module or the SAO processing module. A deblocking buffer may be used to store the DF outputs and the stored DF outputs are read back for SAO processing. According to one embodiment, SAO processing is applied to one or more pixels of the DF output data if the deblocking status indicates that one or more pixels of the DF output data are supported. On the other hand, either partial SAO processing is applied to generate partial SAO results or no SAO processing is applied to cause non-SAO-processed outputs if the deblocking status indicates that said one or more pixels of the DF output data are not supported. A block may comprise multiple lines, a single line or a single pixel.

BRIEF DESCRIPTION OF THE DRAWINGS

FIGS. 5A-C illustrate exemplary access-element-based DF and SAO processing, where the block corresponds to a rectangular block of pixels, a line of pixels or a single pixel respectively.

DETAILED DESCRIPTION OF THE INVENTION

Figure 4:
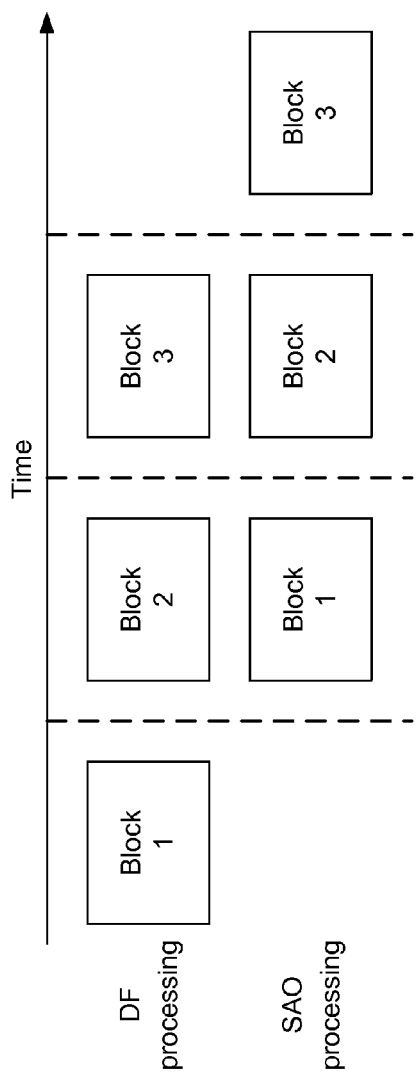
FIG. 4 illustrates exemplary processing flow for block-based DF and SAO processing with pipeline structure.

Block-based pipeline architecture has been widely used in video encoder and decoder hardware. Pipeline architecture in hardware implementation allows different function modules to operate in parallel, where the size of the block can be as large as a frame or as small as a macroblock (MB) or largest coding unit (LCU). An exemplary processing flow of deblocking filter and SAO in block-based pipeline architecture is shown in FIG. 4. DF processing and SAO processing can be applied to different blocks (such as prediction unit, PU as defined in HEVC) concurrently. For example, DF can process block 2 while SAO processes block 1 as shown in FIG. 4. Therefore, a pipeline buffer is required between DF and SAO to store a block of DF-processed data.

Figure 1A:
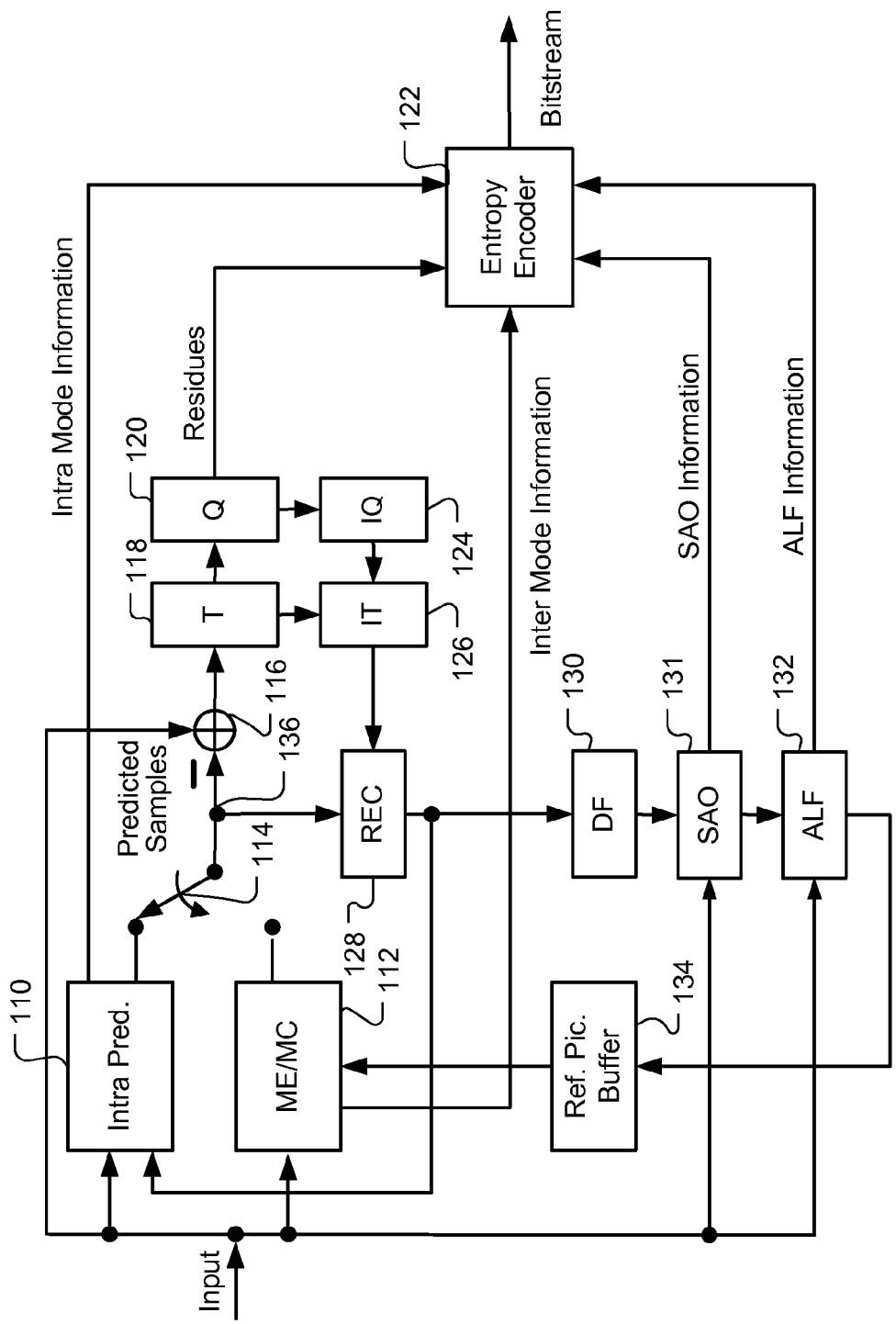
FIG. 1A illustrates an exemplary adaptive inter/intra video encoding system with DF, SAO and ALF in-loop processing.
Figure 1B:
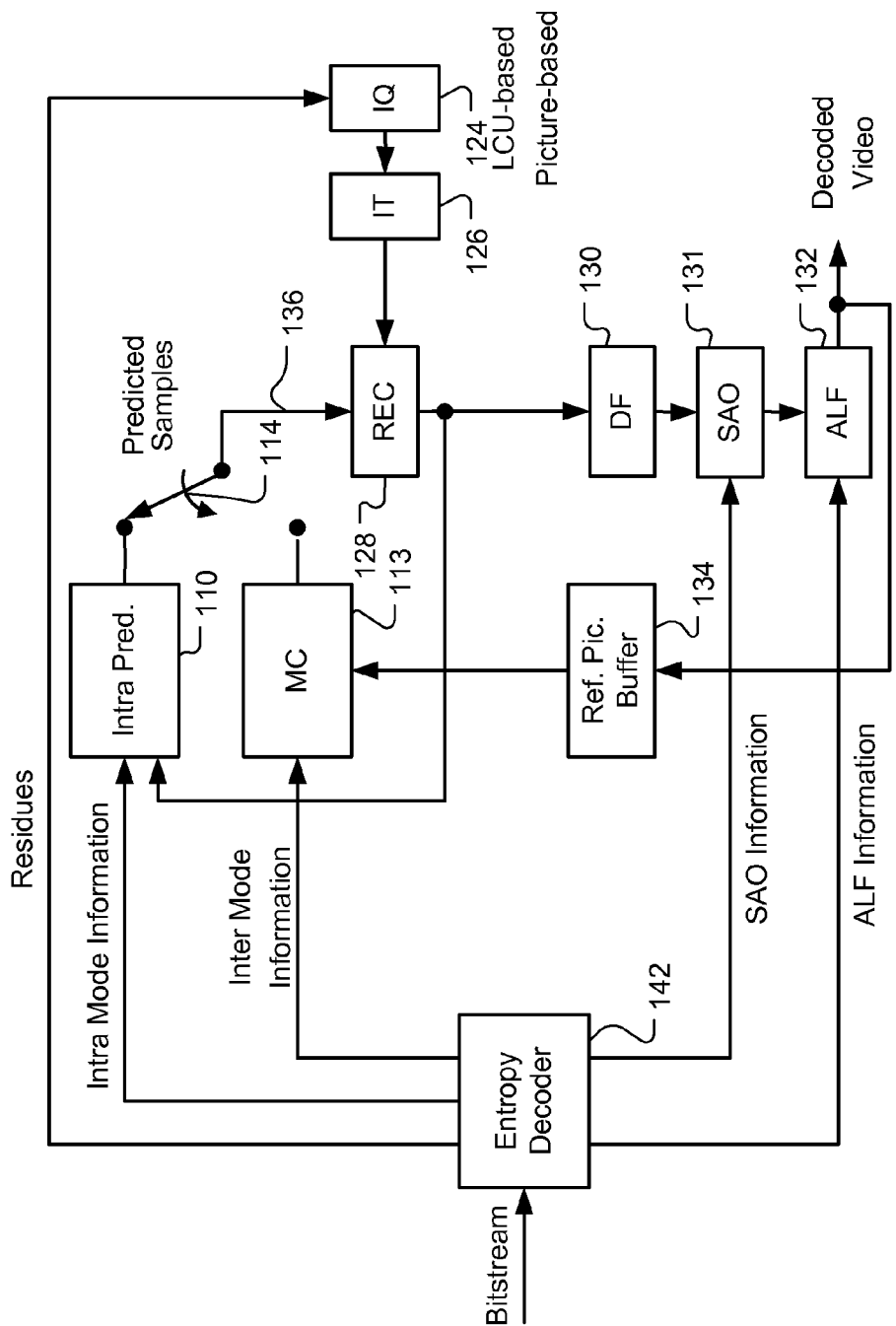
FIG. 1B illustrates an exemplary adaptive inter/intra video decoding system with DF, SAO and ALF in-loop processing.
Figure 2:
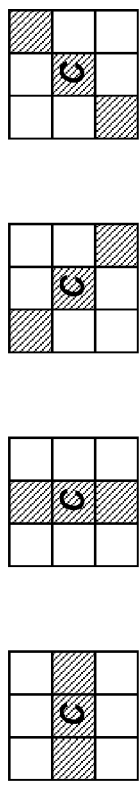
FIG. 2 illustrates neighboring pixel configurations for Edge Offset classification corresponding to 0°, 90°, 135°, and 45° EO types.
Figure 3A:
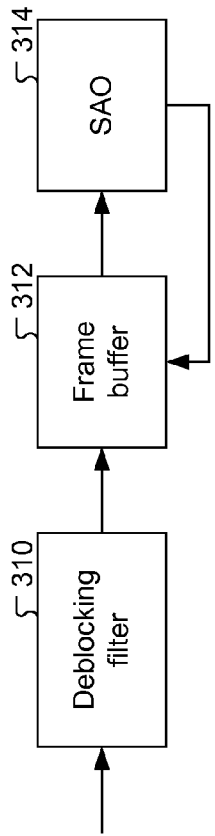
FIG. 3A illustrates an exemplary system block diagram for frame-based DF and SAO processing.
Figure 3B:
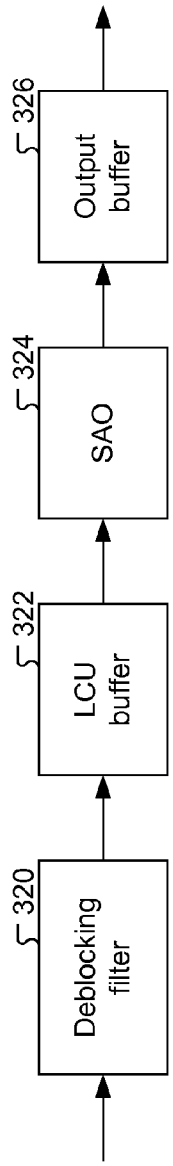
FIG. 3B illustrates an exemplary system block diagram for block-based DF and SAO processing.

FIG. 2 illustrates the data dependency of SAO processing of a current pixel on respective neighboring pixels according to the EO type. For each block, there are some pixels around the vertical and horizontal boundaries that can only be partially DF processed (i.e., only horizontally DF processed) or cannot be DF processed at all until some data from neighboring block arrives as illustrated in FIG. 5A. Therefore, these pixels that have not been processed by DF yet or need to be further processed by DF are not ready for SAO processing. These yet-to-be DF processed pixels in the current block will be stored. When the needed data from a respective neighboring block arrives, these stored yet-to-be DF processed pixels are read back for DF processing. Since the EO-based SAO processing has data dependency on the surrounding pixels, DF processed pixels adjacent to these yet-to-be DF processed pixels in the current block cannot be SAO processed until the needed data from the yet-to-be DF processed pixels become processed in the respective block stage. Therefore, the DF processed pixels adjacent to the yet-to-be DF processed pixels in the current block have to be stored in an on-chip or off-chip buffer for later EO-based SAO processing.

According to Table 1, the SAO category determination is based on comparison results between the current pixel and respective neighboring pixels according to the EO type. Therefore, instead of storing the DF processed data (a column or row) adjacent to the yet-to-be DF processed pixels in the current block, the comparison results associated with the DF processed column or row and respective neighboring pixels according to the EO type can be stored. The comparison results for the current pixel according to the EO type are referred to as partial SAO results in this disclosure. Each of comparison results can be represented in 2 bits. Therefore, the comparison result is more efficient for storage than the DF-processed data.

Due to data dependency associated with DF and SAO, a current block of data cannot be fully processed by DF and SAO until one or more subsequent blocks in the neighbor of the current block become available. The pipeline processing flow according to the present invention can be described as follows. DF processing is applied to a pixel or pixels of a current block and the DF status for the pixel or pixels is determined. If the needed data for SAO processing of the pixel or pixels is available, related DF-processed data and/or partial SAO processed data (i.e., partial SAO results) for the pixel or pixels are read back from on-chip or off-chip storage for SAO processing of the pixel or pixels. If the deblocking status indicates only partial SAO processing can be performed, either partial SAO processing will be applied to generate partial SAO result or no SAO processing will be applied. In this case, either partial SAO results or DF-processed data will be stored in on-chip or off-chip storage. Therefore, the SAO processing in this disclosure may corresponds to full SAO processing, partial SAO processing or no SAO processing. These different types of SAO processing are referred to as status-dependent SAO processing in this disclosure. Furthermore, the full SAO processing may be referred to as SAO processing for convenience in this disclosure.

Conventional coding systems with in-loop filtering always use a block based approach, where the in-loop filtering is performed on a block basis. In other words, data is read, processed, buffered block by block. Nevertheless, in various coding systems, the video data may not be accessed on a block basis. Accordingly, embodiments of the present invention apply in-loop filtering to video data in a coding system where the data read/write is based on an access element. The access element is a unit of data that accessed for in-loop filtering process. An access element may correspond to a single pixel (either an individual color component or all color components), pixel groups, a pixel line, a block, a coding unit (CU) or largest coding unit (LCU), a group of blocks, CUs or LCUs.

FIG. 5A illustrates an example of data dependency in access-element-based DF and SAO processing, where each access element (i.e., a block in this example) corresponds to a rectangular block of pixels. The first row of access elements (i.e., blocks) consists of block $R_1 1$, block $R_1 2$, etc. The second row of blocks consists of block $R_2 1$, block $R_2 2$, etc. According to the H.264/AVC or the HEVC standard, horizontal DF processing across a vertical boundary requires data from the right side of the boundary, where block processing sequence from left to right is assumed. Therefore, some columns of pixels (indicated by 510 in FIG. 5A) in the current block to the left side of the vertical boundary cannot be horizontally DF-processed until required data from the right-side neighboring block becomes available. Similarly, some lines of pixels (indicated by 520 in FIG. 5A) in the current block above a horizontal boundary cannot be vertically DF-processed until the needed data from the lower-side neighboring block becomes available. The pixels in areas 510 and 520 have to be buffered in on-chip or off-chip storage for DF processing during subsequent stage.

An embodiment according to the present invention determines DF processing status and applies status-dependent SAO processing according to the DF processing status. For example, for a pixel in the current block $R_1 1$ and outside areas 510 and 520, the pixel can be SAO processed or partially SAO processed. Since the EO type of SAO relies on surrounding pixels to determine the SAO category, the required surrounding data may not be available yet for some pixels. However, partial SAO can be performed for these pixels in the current block $R_1 1$ and outside areas 510 and 520. For example, for the DF-processed line immediately above area 520, SAO processing cannot be performed since the line below is not DF processed yet. However, partial SAO processing can be performed for the DF-processed line immediately above area 520, the partial SAO result corresponding to comparing a selected pixel in the DF-processed line immediately above area 520 with a corresponding pixel (i.e., the above, upper-left or upper-right pixel) according to the EO type (i.e., 90°, 135°, or 45° in this case). Similarly, partial SAO processing can be applied to the DF-processed column immediately to the left side of area 510. The partial SAO results have to be buffered in on-chip or off-chip storage for SAO processing in a later pipeline stage. The DF-processed data or partial SAO results will be read back for SAO processing later. For example, the DF-processed data or partial SAO results for the column immediately to the left side of area 510 will be read back before SAO processing on block $R_1 2$. Similarly, the DF-processed data or partial SAO results for the row immediately above area 520 will be read back before SAO processing on block $R_2 1$. As discussed above, the status-dependent SAO processing according to DF processing status may be full SAO processing (referred as SAO processing for convenience in this disclosure), partial SAO processing, or no SAO processing. In case of SAO processing, a SAO processed data is generated. In case of partial SAO processing, partial SAO results are generated and the partial SAO results are stored for SAO processing in a later pipeline stage.

FIG. 5B illustrates another example of data dependency in access-element-based DF and SAO processing, where each access element corresponds to a line of pixels. SAO processing or partial SAO processing can be applied to DF-processed data in an access element (i.e., a line segment, also called a line for convenience in this disclosure). There will be an area of pixels at the end of a current line (such as area 530) that cannot be horizontally DF processed. The area of pixels 530 has to wait for needed data in the following line at the right side (i.e., line E) to become available before horizontal DF processing can be applied. For line A, there is no data in the line can be SAO processed in some EO types ((i.e., 90°, 135°, or 45°. Therefore, SAO processing in these EO types will be applied to the line in this case. However, there is some data that can be partial SAO processed (i.e., 0-degree EO type). Therefore the whole line A and partial SAO results associated with line A need be stored in on-chip or off-chip storage for SAO processing in a later pipeline stage. In the stage of line B for SAO processing, the whole line A or partial SAO results are read back from the on-chip or off-chip storage to complete SAO processing on line A. In the stage of line E for SAO processing, the data in area 530 are read back from the on-chip or off-chip storage.

FIG. 5C illustrates another example of data dependency in access-element-based DF and SAO processing, where each access element corresponds to a single pixel. SAO processing or partial SAO processing can be applied to pixel A. However, for EO type SAO, there is no needed data available for SAO processing for pixel A at this time. Therefore, the data for pixel A is stored in on-chip or off-chip storage. In the stage of pixel B with 0-degree EO, pixel A data is read back from the on-chip or off-chip storage and the SAO processing (i.e., 0-degree EO) for pixel A can be performed. Partial SAO processing for pixel B can also be performed and the result is stored. In the stage of pixel F with 90-degree EO, pixel A data is read back and SAO processing for pixel A can be performed. Partial SAO processing for pixel F will also be performed and the result will be stored. In the stage of pixel G with 135-degree EO, pixel A data is read back and SAO processing for pixel A can be performed. Partial SAO processing for pixel G will also be performed and the result will be stored.

According to SAO processing shown in FIG. 2 for the four EO types, SAO processing of a current pixel (i.e., pixel C in FIG. 2) needs the neighboring eight pixels to determine the EO category. SAO processing for the current pixel and one of the eight neighboring pixels is independent of SAO processing for the current pixel and another of the eight neighboring pixels. Therefore, according to an embodiment of the present invention, if all eight neighboring pixels are DF processed and stored in a buffer, SAO processing does not have to be applied between the current pixel and the neighboring pixels for all SAO types during the processing time for the current pixel. For example, SAO processing between the current pixel and the upper neighboring pixel can be performed in the current pixel processing time. SAO processing between the current pixel and other neighboring pixels can be performed later. The DF processed pixels stored in the pipeline buffer for SAO processing are referred to as "available" pixels in this disclosure.

Figure 6:
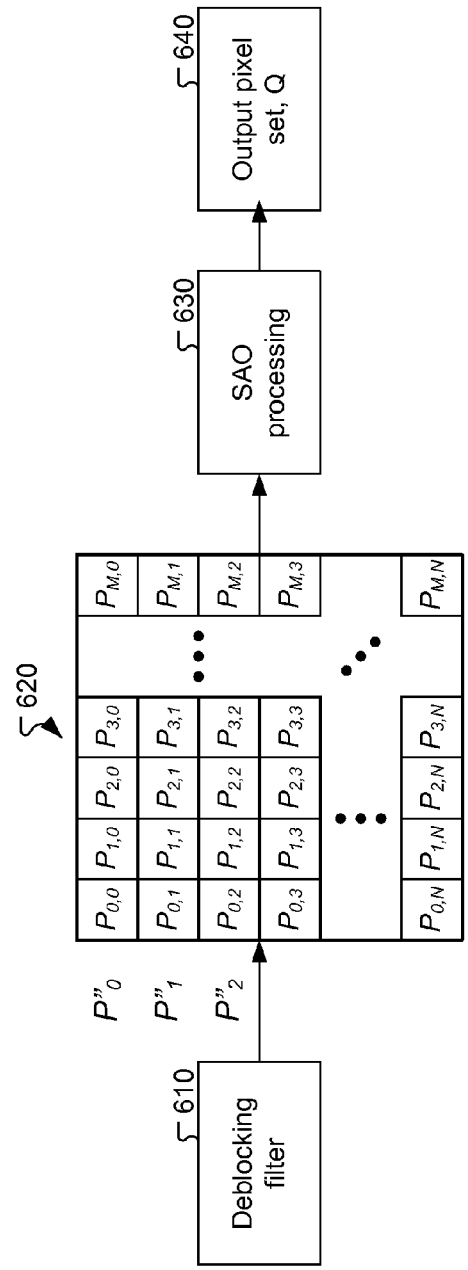
FIG. 6 illustrates an exemplary pipeline buffer between DF processing and SAO processing.

Systems incorporating an embodiment of the present invention monitor the current available data in the pipeline buffer between DF and SAO and determine status-dependent SAO processing. For example, SAO may start its processing earlier than a traditional pipeline. If a decoder processor system uses block-based pipeline architecture with M×N block size, a pipeline buffer is required to store a set of DF-processed pixels, P (i.e., deblocked pixels) for subsequent SAO processing. FIG. 6 illustrates an example of the pipeline buffer to store the DF processed pixel block or pixel set P, where $P=\{p_{0,0}, p_{0,1}, \ldots, p_{M,N}\}$. The output from deblocking filter 610 is stored in pipeline buffer 620 for subsequent SAO processing 630. If P' corresponds to another set of pixels to be processed by SAO in the pipeline stage, then pixel block or pixel set P' must be within pixel set P. This is because a pixel $p_{x,y} \in P'$ can only be processed by SAO when EO is used and the pixel block $\{p_{x',y'} | x-1 \le x' \le x+1, y-1 \le y' \le y+1, p_{x',y'} \in P\}$ is available. This may also be because that band offset is used and the pixel $p_{x,y} \in P$ is available. Set P' may be partitioned into (K+1) sets $P''_k$, where $k=0,1, \ldots, K$ and $$\bigcup_{k=0}^{K} P''_k = P'.$$

A method incorporating an embodiment of the present invention includes the following two steps.
1. A pixel set Q of SAO output pixels (box 640 in FIG. 6) is cleared initially.
2. For each pixel set $P''_k = \{p_{x,y} | a \le x \le b, c \le y \le d\} \subset P'$, wait until the pixel block $R_k = \{p_{x',y'} | a-1 \le x' \le b+1, c-1 \le y' \le d+1\}$ is available in the pipeline buffer, then trigger SAO to start processing $P''_k$ and let $Q=Q+P''_k$.

The set $R_k$ in step 2 is referred to as a supporting set in this disclosure. Step 2 above describes that SAO processing can be applied to selected set $P''_k$ as soon as supporting set $R_k$ becomes available. In other words, a selected set of data (i.e., $P''_k$) is ready for SAO processing as soon as a supporting set (i.e., $R_k$) becomes available. If the supporting set for a selected set is available, the selected set is called supported. Nevertheless, even if the supporting set for a selected set is not fully available, partial SAO may be applied to some pixels in the selected set. Depending on the selected set, the supporting set may be available much earlier than DF processing for the block is complete. Therefore, SAO processing can start sooner than a conventional pipeline structured system where SAO processing waits for a whole block of data to become available.

In a decoder system, when M×N block is partitioned into (K+1) sets, the sets $P''_0$–$P''_K$ usually have the same size for convenient implementation. As the number of sets increases, each set becomes smaller. When the set size becomes very small, such as a line, the access-element-based pipeline with the access element corresponding to a line can be used between deblocking and SAO. In this case, the access-element-based pipeline with the access element corresponding to a line can be used between deblocking and SAO while other parts of the decoder may still use M×N block-based, MB-based or LCU-based pipeline. Embodiments of the present invention treat the DF and SAO processing as single-stage pipelined structure to increase processing efficiency. The status of the deblocking output has to be monitored closely in order to achieve the high performance goal. The monitoring task can be performed by the DF processing module, SAO processing module, or jointly. In the first embodiment, SAO processing module monitors the deblocking status and performs the SAO operations according to deblocking status. For example, each pixel $p_{0,0}$, in pipeline buffer 620, i.e., $P=\{p_{0,0}, p_{0,1}, \ldots, p_{M,N}\}$ is associated with a deblocking status, such as bit 1 indicating the underlying pixel being available and bit 0 indicating the underlying pixel being unavailable. In this case, the SAO processing module actively monitors the status of the pixels in the pipeline buffer by initiating reading deblocking status instead of waiting for the data to be provided by the DF processing module. For each selected data set $P''_k$ (i.e., $\{p_{x,y}|a\le x\le b, c\le y\le d\}$) to be processed by SAO, the SAO processing module according to the first embodiment of the present invention monitors the deblocking status of the pixels in the pipeline buffer corresponding to supporting set $R_k$ (i.e., $\{p_{x',y'}|a-1\le x'\le b+1, c-1\le y'\le d+1\}$) associated with $P''_k$. If the deblocking status for all pixels associated with supporting set $R_k$ is available, the SAO processing module may process selected data set $P''_k$ by reading supporting set $R_k$ and applying SAO operations on $R_k$.

In the second embodiment of the present invention, the SAO processing module passively receives the deblocked results from the deblocking process module. In this case, the deblocking module determines the sending order of deblocked data and sends the data for SAO processing. The SAO processing module only "passively" receives the deblocked results sent by the DF processing module. The SAO processing module will monitor the status of the deblocked data received from the DF processing module. For each selected data set $P''_k$ to be processed by SAO, the SAO processing module according to the second embodiment passively receives data from the DF processing module and determines the deblocking status of the pixels in the pipeline buffer corresponding to supporting set $R_k$ associated with $P''_k$ accordingly. If the deblocking status for all pixels associated with supporting set $R_k$ is available, the SAO processing module may process selected data set $P''_k$ by applying SAO operations on $R_k$. In this case, the DF processing module determines the sending order of deblocking results and provides the data to the SAO processing module. Therefore, the SAO processing module only needs to determines whether the corresponding supporting set $R_k$ has been received in order to apply the SAO operations on selected data set $P''_k$.

In the third embodiment of the present invention, the DF processing module monitors the deblocking status of the pixels in the pipeline buffer and provides the deblocking results to SAO processing module. Similar to the second embodiment, the DF processing module determined the sending order of deblocking results. However, monitoring the deblocking status is performed by the DF processing module instead of the SAO processing module. In this case, for each selected data set $P''_k$ to be processed by SAO, the DF processing module according to the third embodiment determines the deblocking status of the pixels in the pipeline buffer corresponding to supporting set $R_k$ associated with $P''_k$. The DF processing module will also determines the sending order and range of data to be provided for SAO processing. If the DF processing module determines that supporting set $R_k$ is ready for SAO processing of $P''_k$, the DF processing module will trigger the SAO processing module to apply SAO operations on selected data set $P''_k$. In this case, the task of monitoring deblocking output is done by the DF processing module. The SAO processing module is only triggered or notified by the DF processing module regarding whether supporting set $R_k$ is ready for SAO processing of $P''_k$.

Embodiments according to the present invention allow SAO processing to start and output a set P" of pixels, where $P'' \subset P'$ and $P'' \ne P'$ before all pixels in P are available.

According to data dependency associated with SAO processing, a pixel $p_{m,n} \in P$ is not used by SAO any more if a window, $W_{m,n}$ of pixels at (m,n) has been processed by SAO, i.e., $W_{m,n}=\{p_{x,y}|m-1<=x<=m+1, n-1<=y<=n+1\} \subset Q$. Therefore, the buffer space of $p_{m,n}$ can be re-used by other pixel data to save the buffer size. Consequently, systems incorporating an embodiment of the present invention can use a reduced pipeline buffer with space corresponding to H×V pixels, where H<M and/or V<N. In one embodiment, the system with reduced pipeline buffer monitors each pixel $p_{m,n} \subset P$ and determines whether $W_{m,n}=\{p_{x,y}|m-1<=x<=m+1, n-1<=y<=n+1\} \subset Q$. If all pixels in window $W_{m,n}$ have been SAO processed, the buffer space of $p_{m,n}$ can be released. On the other hand, deblocking filter will need to monitor whether there is enough space in the pipeline buffer for storing DF-processed data. When the pipeline buffer is full, the deblocking filter may temporarily halt data output to avoid buffer overflow.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of applying deblock filter (DF) processing and sample adaptive offset (SAO) processing to reconstructed video data, the method comprising:
   generating reconstructed video data by decoding a video bitstream using entropy decoding, inverse scaling, inverse quantization, inverse transform, intra/inter prediction or a combination thereof;
   applying the DF processing to a current block of reconstructed video data to generate DF output data corresponding to the current block, wherein the DF processing is performed using a DF processing module and deblocking status is determined during said applying the DF processing; and applying status-dependent SAO processing to one or more pixels of the DF output data corresponding to the current block according to the deblocking status, wherein the status-dependent SAO processing is performed using a SAO processing module, and the status-dependent SAO processing comprises SAO processing, partial SAO processing, and no SAO processing;

wherein the deblocking status indicates whether DF-processed pixels needed by the SAO processing are available; and when the status-dependent SAO processing performs the partial SAO processing according to the deblocking status, the partial SAO processing is performed under a condition that a portion of the DF-processed pixels needed by the SAO processing is not available yet.

2. The method of claim 1, wherein the deblocking status is determined by the DF processing module, the SAO processing module, or both.

3. The method of claim 1, wherein the SAO processing module monitors the deblocking status by determining the deblocking status of the DF output data associated with a supporting pixel set corresponding to a selected pixel set in the current block, and wherein the SAO processing module applies the status-dependent SAO processing on the selected pixel set if the deblocking status indicates that the supporting pixel set is available.

4. The method of claim 3, wherein the SAO processing module determines the deblocking status by initiating reading the DF output data associated with the supporting pixel set.

5. The method of claim 3, wherein the SAO processing module determines the deblocking status by receiving the DF output data associated with the supporting pixel set and data sending order of the DF output data associated with the supporting pixel set is determined by the DF processing module.

6. The method of claim 1, wherein the DF processing module monitors the deblocking status by determining the deblocking status of the DF output data associated with a supporting pixel set corresponding to a selected pixel set in the current block, and wherein the SAO processing module applies the status-dependent SAO processing on the selected pixel set if the deblocking status from the DF processing module indicates that the supporting pixel set is available.

7. The method of claim 1, wherein said applying the status-dependent SAO processing corresponds to applying the SAO processing if the deblocking status indicates that said one or more pixels of the DF output data are supported, and said applying the status-dependent SAO processing corresponds to applying the partial SAO processing to generate partial SAO results or applying no SAO processing to cause non-SAO-processed outputs corresponding to said one or more pixels of the DF output data if the deblocking status indicates that said one or more pixels of the DF output data are not supported.

8. The method of claim 7, wherein the current block corresponds to multiple lines and the deblocking status corresponds to that three or more pixel lines are deblocked, wherein the SAO processing is applied to at least a portion of one or more middle pixel lines of said three or more pixel lines, and wherein the pixel line corresponds to one or more consecutive pixels from a same pixel row or a same pixel column.

9. The method of claim 7, wherein the current block corresponds to multiple lines and the deblocking status corresponds to that two pixel lines are deblocked, wherein the partial SAO processing or no SAO processing is applied to at least a portion of one or both of said two pixel lines, and wherein the pixel line corresponds to one or more consecutive pixels from a same pixel row or a same pixel column.

10. The method of claim 7, wherein the current block comprises one pixel row or one pixel column and the deblocking status corresponds to that said one pixel row or one pixel column is deblocked, wherein the SAO processing is applied to at least a portion of said one pixel row if band offset (BO) or 0-degree edge offset (EO) is used, and wherein the SAO processing is applied to at least a portion of said one pixel column if the band offset (BO) or 90-degree edge offset (EO) is used.

11. The method of claim 7, wherein the current block corresponds to multiple lines and the deblocking status corresponds to that a window of 3×3 pixels is deblocked, wherein the SAO processing is applied to a center pixel of the window.

12. The method of claim 7, wherein the current block corresponds to a single pixel and the deblocking status corresponds to that the single pixel is deblocked, and wherein the SAO processing is applied to the single pixel if band offset (BO) is used.

13. The method of claim 7, wherein the partial SAO results or the non-SAO-processed outputs corresponding to said one or more pixels of the DF output data are stored in a deblocking buffer.

14. The method of claim 13, wherein the partial SAO results or the non-SAO-processed outputs corresponding to said one or more pixels of the DF output data are read back from the deblocking buffer for the SAO processing on said one or more pixels of the DF output data corresponding to the current block during a pipeline stage for a subsequent block.

15. The method of claim 14, wherein the subsequent block corresponds to a neighboring block below or on a right side of the current block.

16. The method of claim 7, wherein if a current pixel and a neighboring pixel on a left side of the current pixel are deblocked, the deblocking status indicates that the neighboring pixel is supported and the current pixel is not supported when the SAO processing corresponds to 0-degree edge offset (EO).

17. The method of claim 7, wherein if a current pixel and a neighboring pixel on an upper side of the current pixel are deblocked, the deblocking status indicates that the neighboring pixel is supported and the current pixel is not supported when the SAO processing corresponds to 90-degree edge offset (EO).

18. The method of claim 7, wherein if a current pixel, a first neighboring pixel on an upper-right side of the current pixel are deblocked, and a second neighboring pixel on an upper-left side of the current pixel are deblocked, the deblocking status indicates that the first neighboring pixel is supported and the current pixel is not supported when the SAO processing corresponds to 45-degree edge offset (EO), and the deblocking status indicates that the second neighboring pixel is supported and the current pixel is not supported when the SAO processing corresponds to 135-degree edge offset (EO).

19. The method of claim 7, wherein the DF output data, the partial SAO results, and the non-SAO-processed outputs are stored in a deblocking buffer, and wherein the DF output data, the partial SAO results, and the non-SAO-processed outputs are read back from the deblocking buffer for the SAO processing of the current block.

20. The method of claim 19, wherein an SAO starting time for the SAO processing of the current block is between a DF-output starting time and a DF-output ending time of the current block, wherein the DF-output starting time is associated with storing a first DF output to the deblocking buffer and wherein the DF-output ending time is associated with storing a last DF output to the deblocking buffer.

21. The method of claim 20, wherein a DF starting time of a next block is earlier than an SAO ending time of the current block by a period of t, wherein t is smaller than time difference between the DF-output starting time of the next block and the DF starting time of the next block.

22. An apparatus for applying deblock filter (DF) processing and sample adaptive offset (SAO) processing to reconstructed video data, the apparatus comprising:
- a video reconstruction module to generate reconstructed video data by decoding a video bitstream using entropy decoding, inverse scaling, inverse quantization, inverse transform, intra/inter prediction or a combination thereof;
- a DF processing module to apply DF processing to a current block of reconstructed video data to generate DF output data corresponding to the current block, wherein deblocking status is determined during said applying the DF processing; and
- an SAO processing module to apply status-dependent SAO processing to one or more pixels of the DF output data corresponding to the current block according to the deblocking status, wherein the status-dependent SAO processing comprises SAO processing, partial SAO processing, and no SAO processing wherein the deblocking status indicates whether DF-processed pixels needed by the SAO processing are available; and when the status-dependent SAO processing performs the partial SAO processing according to the deblocking status, the partial SAO processing is performed under a condition that a portion of the DF-processed pixels needed by the SAO processing is not available yet.

23. The apparatus of claim 22, further comprising a deblocking buffer to store the DF output data is stored, wherein said one or more pixels of the DF output data are read back from the deblocking buffer according to the deblocking status for the SAO processing.

24. The apparatus of claim 22, wherein the SAO processing module applies the SAO processing to said one or more pixels of the DF output data if the deblocking status indicates said one or more pixels of the DF output data are supported.

25. The apparatus of claim 22, wherein the SAO processing module applies the partial SAO processing to said one or more pixels of the DF output data to generate partial SAO results, or the SAO processing module applies no SAO processing to cause non-SAO-processed outputs corresponding to said one or more pixels of the DF output data if the deblocking status indicates said one or more pixels of the DF output data are not supported.

* * * * *